(12) United States Patent
Gazzaneo et al.

(10) Patent No.: US 12,467,517 B2
(45) Date of Patent: Nov. 11, 2025

(54) POWER TRANSMISSION BELT AND ITS TRANSMISSION SYSTEM

(71) Applicant: DAYCO EUROPE S.R.L., Chieti (IT)

(72) Inventors: Giuseppe Gazzaneo, Chieti (IT); Fabio Nardone, Chieti (IT); Arcangelo Di Carlo, Chieti (IT); Carlo Piermatteo, Chieti (IT); Marco Di Meco, Chieti (IT)

(73) Assignee: Dayco Europe S.R.L., Chieti (IT)

( * ) Notice: Subject to any disclaimer, the term of this patent is extended or adjusted under 35 U.S.C. 154(b) by 0 days.

(21) Appl. No.: 18/551,966

(22) PCT Filed: Mar. 24, 2022

(86) PCT No.: PCT/IB2022/052703
§ 371 (c)(1),
(2) Date: Sep. 22, 2023

(87) PCT Pub. No.: WO2022/201086
PCT Pub. Date: Sep. 29, 2022

(65) Prior Publication Data
US 2024/0167535 A1 May 23, 2024

(30) Foreign Application Priority Data
Mar. 24, 2021 (IT) .................. 102021000007196

(51) Int. Cl.
*F16G 5/20* (2006.01)
*F16G 1/10* (2006.01)
(Continued)

(52) U.S. Cl.
CPC ................ *F16G 5/20* (2013.01); *F16G 1/28* (2013.01); *F16G 5/08* (2013.01)

(58) Field of Classification Search
CPC ..... F16G 5/20; F16G 1/28; F16G 5/08; F16G 1/10
See application file for complete search history.

(56) References Cited

U.S. PATENT DOCUMENTS

| 3,981,206 | A | 9/1976 | Miranti et al. |
| 8,293,357 | B2 * | 10/2012 | Cretin .................. F16G 1/28 428/167 |

(Continued)

FOREIGN PATENT DOCUMENTS

| CA | 3100307 A1 * | 1/2020 | ............. B32B 25/02 |
| EP | 1106864 A1 * | 6/2001 | ............... F16G 1/28 |

(Continued)

OTHER PUBLICATIONS

PCT/IB2022/052703 International Search Report and Written Opinion, Jun. 17, 2022 (15 pages).

(Continued)

*Primary Examiner* — Anna M Momper
*Assistant Examiner* — Katelynne R Burrell
(74) *Attorney, Agent, or Firm* — FisherBroyles, LLP; Susan M. Oiler

(57) ABSTRACT

A power transmission belt having a body made of a first elastomeric material, a plurality of cords embedded in the body of the belt, a back and a plurality of ribs or teeth. The back or the ribs or the teeth are covered by a covering material chosen from the group composed of woven fabric and knitted fabric. The covering material includes elastolefin fibres, and preferably at least one elastolefin thread.

23 Claims, 1 Drawing Sheet

(51) Int. Cl.
*F16G 1/28* (2006.01)
*F16G 5/08* (2006.01)

(56) References Cited

U.S. PATENT DOCUMENTS 8,888,635 B2 * 11/2014 Mori .......................... F16G 5/08
474/237
2018/0305177 A1 * 10/2018 Zhao ...................... D07B 1/165

FOREIGN PATENT DOCUMENTS

WO    WO-2007117681 A2 * 10/2007    ............... F16G 1/28
WO    WO-2020002873 A1 *  1/2020    ............... D02G 3/04

OTHER PUBLICATIONS

Casey et al. Polyolefin Based Crosslinked Elastic Fiber: a Technical Review of DOW XLA™ Elastic Fiver Technology, Polymer Reviews, May 2, 2008, 48:2, p. 302-316.
Snyder, Development of DOW XLA elastic fiber; Enhancing service temperature and chemical resistance in stretch apparel applications, Jan. 1, 2004, p. 3.
Gries et al., Manufacturing of textiles for civil engineering applications, Textile Fibre Composites in Civil Engineering, 2016, Chapter 1.2.1 (Excerpt from Science Direct under heading "Cabled Yarn", accessed Jan. 7, 2025).
Yarn Twisting: All you need to know about Twisted Yarns, Plied Yarn, and Cabled Yarn, SageZander Ltd., Jul. 13, 2021 (https://sagezander.com/twisted-yarns-cabled-yarns-plied-yarns/, accessed Jan. 7, 2025).

* cited by examiner

POWER TRANSMISSION BELT AND ITS TRANSMISSION SYSTEM

CROSS-REFERENCE TO RELATED APPLICATIONS

The present invention is filed under 35 U.S.C. § 371 as the U.S. National Phase of International Patent Application No. PCT/IB2022/052703, filed Mar. 24, 2022, which designated the United States and which claims the benefit of Italian Patent Application no. 102021000007196, filed on Mar. 24, 2021, the entire disclosure of which is incorporated herein by reference.

TECHNICAL FIELD

The present invention concerns a power transmission belt and, in particular, a belt for use in power transmission systems in motor vehicles and relative transmission system.

STATE OF THE ART

The present invention is used preferably for transmission of movement in a transmission assembly of a motor vehicle comprising an engine.

The transmission of movement in motor vehicles is performed preferably using synchronous power transmission belts, also called toothed belts.

In motor vehicles, power transmission belts, also known as multi-groove or poly-V belts, are also used to drive accessories of an engine. An accessory transmission generally comprises a drive pulley connected to a crankshaft of an internal combustion engine of the motor vehicle, at least a second and a third pulley connected for example to an alternator and to an accessory, for example a hydraulic pump, and a transmission belt to connect the pulleys to one another.

Said belts generally comprise a body made of elastomeric material, preferably EPDM for the poly-V belts and HNBR for the toothed belts, a plurality of filiform resistant inserts embedded longitudinally in the body, and a coupling portion integrally connected to the body and comprising a plurality of teeth transverse to the movement direction of the belts in use in the case of toothed belts, or ribs along the direction of movement of the poly-V belt.

Today's engines require the transmission members and in particular the transmission belts to have an increasingly long average working life despite having to operate at high temperatures and with much greater mechanical stress.

In order to prolong the average working life of the transmission belt by reducing its abrasion, it is common practice to provide a layer of material more resistant to abrasion such as, for example, a fabric, a non-woven fabric or a thermoplastic material that covers the ribs at least partially.

However, said solution does not fully solve the problems of ensuring long life.

Furthermore, whether a fabric or a continuous layer of thermoplastic material is used as covering material, both tend to be very stressed and "stretched" at the grooves and ribs during the vulcanization stage. This means that the covering material is weakened at the very points where the stress is greatest during use.

To solve this problem both the fabrics used in the toothed belts and those used in the poly-V belts generally comprise a plurality of threads, including at least one elastic thread which allows the entire fabric to be elastic so that the fabric adheres better to the working surface of the belt, namely to the surface which engages on the pulleys during use, as illustrated for example in the U.S. Pat. No. 3,981,206.

It should furthermore be noted that the above-mentioned covering fabrics entail greater friction between the contact surface of the belt and the pulley. Said greater friction, in addition to further increasing the possibility of breakage, also increases the noise level of the belt during operation.

Alternative technical solutions have therefore been tried in order to obtain simultaneously a high resistance to wear, low noise level, in particular low noise level also in damp conditions, and improved adhesion of the fabric on the body.

The elastic material generally used as elastic thread in the fabrics used in the transmission belts is polyurethane, as illustrated in the same patent described above.

Polyurethane provides adequate elasticity and at the same time does not negatively affect belt performance.

During the manufacturing process of the toothed belts and, in particular, during the vulcanization process, the polyurethane thread generally melts and therefore creates a series of empty spaces in the structure.

These empty spaces inside the belt structure are potentially starting or trigger points for defects that emerge during use of the belt such as cracks, fissures and similar discontinuities that lead to breakages and therefore shorten the life of the belt.

None of the solutions currently on the market simultaneously solve all the problems of the belts and in particular the search is ongoing for a transmission belt with controlled friction, low noise level and at the same time good adhesion, without the problems due to the use of polyurethane.

Due to these problems, the search continues for more performing transmission belts that meet the increasingly stringent specifications established by car manufacturers.

SUMMARY OF THE INVENTION

The object of the present invention is to provide a toothed or poly-V transmission belt that solves the above-mentioned problems and which, in particular, avoids the discontinuities underlying the defects encountered during use of the belt and at the same time has optimal performance.

The above-mentioned object is achieved by a belt that has body in a first elastomeric material, a plurality of cords embedded in the body of the belt, a back, and a plurality of ribs or teeth in which the back or the ribs or teeth are covered with a covering material selected from the group consisting of woven fabric or knitted fabric that includes elastolefin fibers and by the belt implemented in a power transmission system of a motor vehicle.

DESCRIPTION OF THE INVENTION

The expression "main elastomer" means that it is present in the compound forming the body of the belt by over 50% by weight calculated on the total weight of all the elastomers in the compound, therefore excluding all the other non-elastomeric components of the belt.

The expression "first elastomeric material consists essentially of" means that in addition to all the usual additives, it is possible to add to the compound small percentages of other polymers or copolymers without negatively affecting the chemical compatibility between the body compound and the other elements forming the toothed belt and therefore without departing from the scope of the present invention.

By "elastolefin" we mean a fibrous polymer material composed for at least 95% by weight of partially cross-linked macromolecules, therefore they have low crystallinity and can be spun, in which the macromolecules are composed of ethylene and at least one other olefin. Said fibers are for example XLA like those described in the article "Polyolefin Based Crosslinked Elastic Fiber: A Technical Review of DOW XLA™ Elastic Fiber Technology", Paul Casey et al., Polymer Reviews, Volume 48, 2008—Issue 2. Said fibers are elastic, namely when elongated even by 50% they rapidly return to their original length.

Figure 1:
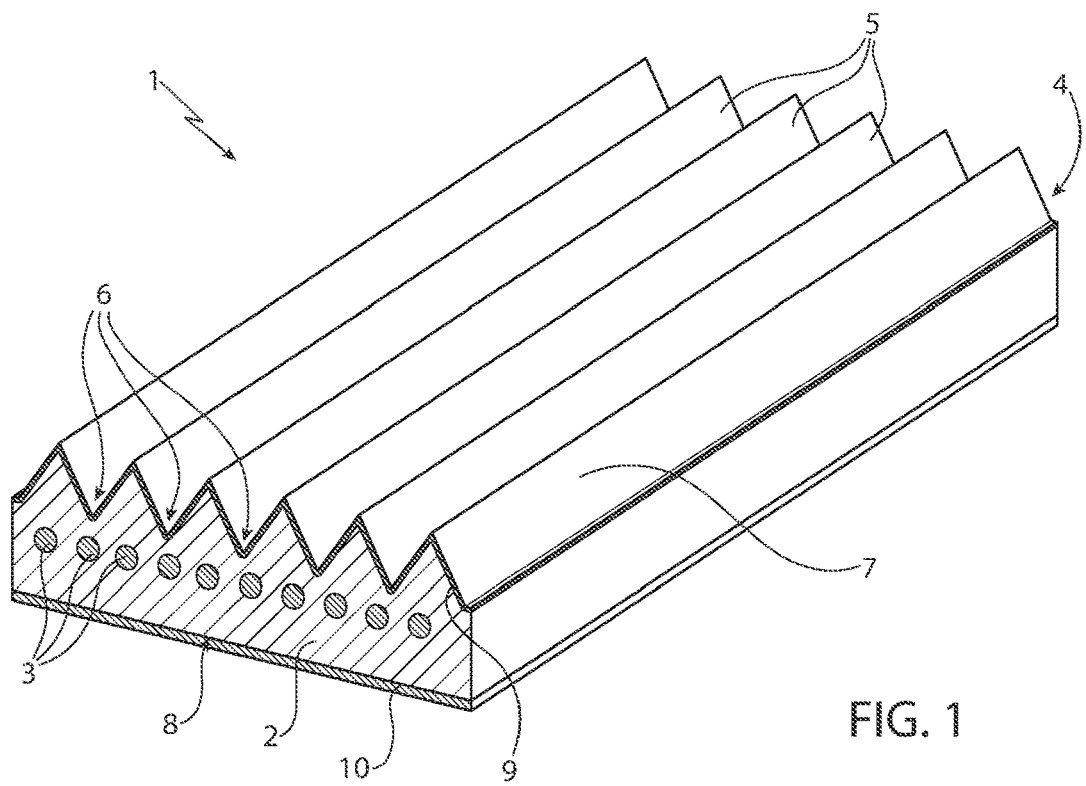
FIG. 1 is a partial schematic view of a portion of a poly-V belt.

With reference to FIG. 1, the number 1 indicates a poly-V belt comprising a body 2 comprising a first elastomeric material, a plurality of filiform resistant inserts 3 embedded longitudinally in the body, also called "cords" below, and a coupling portion 4 integrally connected to the body and comprising a plurality, of ribs, in the following also called "V-shaped ribs" 5 positioned side by side and alternating with V-shaped grooves 6 that form the work surface 7. The belt 1 furthermore has a back 8 defined by the surface opposite the work surface.

Preferably the body 2 is made of a compound comprising one or more elastomeric materials and numerous additives. The elastomeric material (s) are indicated overall for convenience below as "first elastomeric material".

The body 2 of the belt advantageously comprises as main elastomer within the first elastomeric material an elastomer selected from the group formed of natural rubber (NR), polychloroprene (CR), acrylonitrile butadiene rubber (NBR) and relative hydrogenated elastomers known as hydrogenated acrylonitrile butadiene rubber (HNBR) or zinc salts of hydrogenated acrylonitrile butadiene rubber grafted with unsaturated carboxylic acid esters, polyisoprene, styrene-butadiene rubbers, ethylene-alpha-olefin elastomers, EPDM, polyurethane, fluoroelastomers, ethylene acrylic elastomers (AEM), bromobutyl, chlorosulfonated polyethylene (CSM) or alkyl-chlorosulfonate, chlorinated polyethylene, epoxidized natural rubber, SBR, NBR carboxylates, HNBR carboxylates, ACM and mixtures of these compounds.

The body 2 preferably comprises as first or further elastomeric material at least one copolymer of polyolefin or a rubber containing units of acrylonitrile.

More preferably the first elastomeric material comprises an elastomer selected from the group formed of EPM (ethylene-propylene monomer), EPDM (ethylene-propylene-diene monomer), NBR (acrylonitrile butadiene rubber), HNBR (hydrogenated acrylonitrile butadiene rubber), ZnHNBR (acrylonitrile butadiene rubber with zinc salts), XHNBR (peroxide-vulcanized hydrogenated acrylonitrile butadiene rubber).

In particular, of the rubbers containing units of acrylonitrile, the preferred ones are NBR, HNBR and modified HNBR, for example HNBR modified with zinc salt or ZnHBR or XHNBR. In particular, of the polyolefin copolymers, EPDM is preferred.

Even more preferably the body 2 comprises EPDM.
Even more preferably it consists essentially of EPDM.
In particular the embodiment is preferred in which the body comprises more than 60% by weight with respect to the total weight of elastomer, more preferably more than 70% of EPDM.

Alternatively the embodiment in which the body consists essentially of EPDM is also preferred.

The compound of the body can comprise, in addition to the elastomeric materials, conventional additives such as, for example, reinforcing agents, fillers, pigments, stearic acid, accelerators, vulcanization agents, antioxidants, activators, initiators, plasticizers, waxes, prevulcanization inhibitors, antidegradants, process oils and similar.

On the work surface, namely above the ribs, a covering material is generally arranged, preferably a fabric 9, more preferably selected from the group consisting of woven fabric or non-woven fabric or knitted fabric.

Preferably the fabric 9 is treated with an elastomeric material. Preferably the fabric 9 is a knitted fabric.

The knitted fabric has proved to be particularly preferred when it has a warp-knitted or jersey construction.

The weight of the fabric 9 preferably ranges from 50 to 500 g/m$^2$, more preferably from 150 to 300 g/m$^2$, for example 250 g/m$^2$.

The fabric 9 is formed of at least one primary non-elastic thread and a secondary elastic thread, but can also comprise further threads or combine one or more secondary elastic threads with several primary non-elastic threads.

As materials for the primary thread, the polymer materials commonly used in technical fabrics can be advantageously used such as, for example, aliphatic or aromatic polyamides, polyesters, and also natural-based fabrics such as cotton, if necessary also in complex structures or mixed with several threads of chemical type wound over one another.

The use of a fabric comprising primary polyamide threads, preferably an aliphatic polyamide such as nylon 6/6, is particularly preferred.

Preferably both in warp and weft a fabric with dtex between 25 and 250 dtex, more preferably between 30 and 110 dtex, is used.

Preferably the elongation is greater than 90% at 100 N in both directions and greater than 50% at 20 N. The sample is raw. It is tested on dynamometer as a sample of a 50 mm wide fabric with distance of 75 mm between the two dynamometer clamps. The traction is applied at a speed of 500 mm/min.

In a preferred embodiment, also the back 8 of the belt 1 is provided with a covering material, more preferably a fabric.

On the back 8 a fabric 10 is generally arranged preferably selected from the group consisting of woven fabric or non-woven fabric or knitted fabric.

Preferably the fabric 10 is treated with an elastomeric material. Preferably the fabric 10 is a knitted fabric.

The knitted fabric is particularly preferred when it has a warp-knitted or jersey construction.

According to a preferred aspect of the present invention the fabric 9 of the work surface or the fabric 10 of the back 8 comprise at least one elastolefin thread.

Alternatively it is also possible to combine an elastolefin thread with one or more further elastic threads of different material.

The transmission belt of the present invention is formed preferably according to the well-known molding process.

It has been noted that unlike the case when the fabric comprises a single polyurethane thread, after the belt vulcanization step the elastolefin surprisingly has a different behavior, preventing the formation of empty spaces and defects typical of the use of polyurethane.

Figure 2:
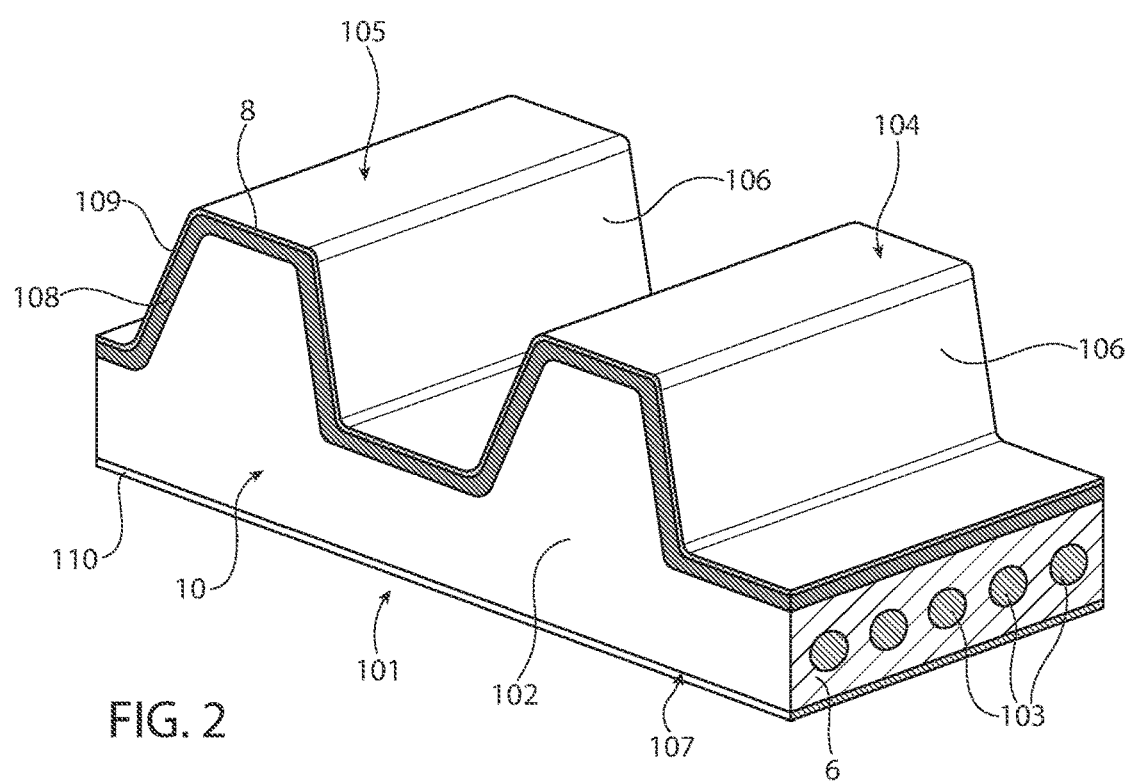
FIG. 2 is a partial schematic view of a portion of a toothed belt.

In a different embodiment of the invention in FIG. 2 a toothed belt is indicated overall by the number 101. The belt 101 comprises a body 102. In the body 102 a plurality of longitudinal filiform resistant inserts 103 are embedded, also alternatively called "cords".

The belt further comprises a toothing 104 composed of a plurality of teeth 106 which in use form the work surface 105, namely the surface that engages on a corresponding pulley of the transmission system.

The toothed belt further comprises a back 107 opposite the work surface 105.

Preferably the body 102 comprises a first elastomeric compound comprising a first main elastomeric material.

Advantageously the pitch of the belt is between 3 mm and 20 mm, more preferably between 5 mm and 14 mm, for example 9.525 ideal for applications on vehicles.

The body 102 of the toothed belt advantageously comprises a first elastomeric material selected from the group consisting of natural rubber (NR), chloroprene rubber (CR), acrylonitrile butadiene rubber (NBR) and relative hydrogenated elastomers known as hydrogenated acrylonitrile butadiene rubber (HNBR) or zinc salts of hydrogenated acrylonitrile butadiene rubber grafted with unsaturated carboxylic acid esters, polyisoprene, styrene-butadiene rubbers, ethylene-alpha-olefin elastomers, EPDM, polyurethane, fluoroelastomers, ethylene acrylic elastomers (AEM), bromobutyl, chlorosulfonated polyethylene (CSM) or alkyl-chlorosulfonate, chlorinated polyethylene, epoxidized natural rubber, SBR, NBR carboxylates, HNBR carboxylates, ACM and mixtures of these compounds.

Advantageously the first elastomeric material is present in the body compound as "main elastomer", namely it is present in the body compound in over 50% by weight calculated on the total weight of all the elastomers in the compound, therefore excluding all the other non-elastomeric components of the belt.

The body 102 preferably comprises as first or as further elastomeric material at least one copolymer of polyolefin or a rubber containing units of acrylonitrile.

More advantageously, the copolymer (s) used as body compounds are nitrile rubbers, advantageously they are acrylonitrile butadiene rubbers, known under the acronym NBR. Even more advantageously, they are hydrogenated acrylonitrile butadiene rubbers, or HNBR, or also XHNBR, namely carboxylated hydrogenated acrylonitrile butadiene rubbers.

For example, fully saturated HNBRs, which have a double bond residual percentage of 0.9% at the most, can be used, but alternatively HNBRs with a lower degree of saturation such as, for example, partially saturated HNBRs having a saturation degree of 4% or 5.5%, can also be used.

Even more advantageously, in combination with a first elastomeric material, also an elastomeric material formed of a mixture of one or more copolymers is used, obtained from a diene monomer and a monomer containing nitrile groups where an acid or a salt of an unsaturated carboxylic acid are added to one or more of said copolymers. More advantageously the unsaturated carboxylic acid is methacrylic or acrylic acid and said salt is a zinc salt of the methacrylic or acrylic acid. Even more advantageously, a zinc salt of the methacrylic acid is used. Even more advantageously, the zinc salt of the methacrylic acid is added in a quantity ranging from 10 to 60 phr.

For example, the elastomers sold by Zeon under the following names are advantageously used: ZSC 1295, ZSC 2095, ZSC 2195, ZSC 2295, ZSC 2295L, ZSC 2295R and ZSC 2395.

In particular it is possible to partially or entirely substitute the HNBRs previously cited, namely the ZETPOL and/or THERBAN, with a ZSC which comprises an unsaturated carboxylic acid and zinc oxide and/or with THERBAN ART which comprises an unsaturated carboxylic acid salt.

Mixed compounds of polyolefins and rubbers containing units of acrylonitrile, more preferably compounds containing a copolymer of ethylene with NBR or HNBR or the above-mentioned modified HNBRs, are also preferred. For example rubbers containing EPDM (ethylene propylene diene monomer) or EPM (ethylene propylene monomer) can be added to polymers containing units of acrylonitrile in a quantity preferably ranging from 1 to 30%.

In addition to the elastomeric materials, the body compound can comprise conventional additives as, such for example, reinforcement agents, fillers, pigments, stearic acid, accelerators, vulcanization agents, antioxidants, activators, initiators, plasticizers, waxes, prevulcanization inhibitors, antidegradants, process oils and similar.

The cords 103 are formed of a plurality of threads or strands or yarns and each thread is formed of a plurality of filaments. Preferably the cords 103 are made of at least one material selected from the group consisting of glass fibers, aramid fibers, carbon fibers, PBO fibers, even more preferably they have at least outer filaments made of glass, since this material has proved to be particularly critical when it has to be used at low temperatures.

Alternatively the cords can be made of two different materials. Even more preferably at least the outer surface of the cords is made of glass fibers.

Advantageously the work surface of the transmission belt 101 is covered by a covering 108. The covering 108 is selected more advantageously from the group consisting of woven fabric, knitted fabric, or non-woven fabric.

The covering fabric 108 of the toothing 105 or the optional covering fabric of the back 110 can consist of one or more layers and can be obtained by means of different weaving techniques, for example, by means of the weaving technique known as 2×2 twill.

The covering fabric 108, 110 has a structure composed of a weft and a warp.

More advantageously if a woven fabric is used, the covering 108, 110 comprises threads which extend substantially in the longitudinal direction of the toothed belt. Generally said longitudinal threads are the weft threads.

Advantageously the weft threads comprise at least an elastic thread and at least a thread with high thermal and mechanical resistance such as, for example, aliphatic polyamide, aromatic or aramid polyamide, PET, polyesters, and also natural-based fabrics such as cotton, if necessary also in complex or mixed structures with several threads of chemical type wound on one another.

The elastic thread serves to facilitate the extension of the fabric so as to follow the profile of the teeth during the vulcanization phase.

Even more advantageously the weft threads comprise an elastic thread and at least one first and one second thread, more preferably the first and the second thread are polyamides, even more preferably they are made of an aliphatic polyamide such as the polyamide 6, 6 and an aromatic polyamide such as, for example, a poly-para-aramid, as for example illustrated in the patent EP0965271.

In a preferred embodiment both threads wound around the thread or the elastic threads are made of polyaramid.

In a particularly preferred embodiment of the invention, a transmission belt 101 in which the work surface is covered by a fabric in which a first thread of polyaramid fibers is wound around an elastic thread in a first direction S and a second thread of polyaramid fibers is wound in the opposite direction Z around the first thread proved particularly resistant in oil.

According to an aspect of the present invention, the elastic thread comprises fibers of an elastolefin that allows the elasticity of the fabric during formation of the tooth. More preferably there is one elastic thread and it is made entirely of elastolefin. Optionally it is also possible to use several elastic threads including at least one made of elastolefin.

It has been noted that the use of elastolefin as a base for the elastic thread not only allows the fabric to extend correctly during the vulcanization phase to form the work surface, but also avoids the discontinuities that occur when using polyurethane threads.

Advantageously the weft threads comprise para-polyaramid fibers.

For example the weft threads can be formed by winding around a polyurethane thread a pair of para-polyaramid threads, for example Technora threads.

Advantageously the warp threads comprise meta-polyaramid fibers.

The use of meta-polyaramid threads has proved particularly advantageous since it has surprisingly been found that it is able to maintain optimal tension values also at high temperatures and in oil mixed with petrol. In particular Conex threads, even more preferably in configuration 40/2, have proved to be particularly advantageous.

Advantageously fabrics are used that have weft threads composed of an elastolefin thread on which two poly para-aramid threads are wound with an overall tensile strength of the fabric pretreatments in the longitudinal direction of the belt ranging from 700 to 1300 N/25 mm, even more advantageously from 900 to 1100 N/25 mm.

Advantageously fabrics are used which have warp threads composed of a poly meta-aramid thread with an overall elasticity of the fabric in the latitudinal direction ranging from 600 to 1200 N/25 mm, even more advantageously from 800 to 1000 N/25 mm.

Advantageously fabrics are used having a post-treatment weight ranging from 400 to 1000 grams/m². Even more advantageously from 500 to 700 grams/m².

The fabric 108, 110 generally undergoes a first, a second, third and fourth treatment.

Said treatments have proved to be very advantageous, ensuring long life of the belt in continuous contact with oil at high temperature.

Advantageously the first treatment is based on polyisocyanates.

The first treatment proved to be particularly effective in ensuring adhesion of the polyaramid fibers, and therefore in the case of the present invention the entire fabric, to the body elastomers.

Advantageously the fabric 108, 110 subsequently undergoes a second treatment with RFL.

Advantageously the fabric 108, 110 subsequently undergoes a third rubber-based treatment, also called cement, preferably a hydrogenated nitrile rubber, for example a Zetpol.

Furthermore preferably the fabric 108 of the work surface 105 of the toothed belts 101 of the present invention is covered with a fourth treatment, even more preferably said treatment forms a layer 109 which is for example calendered over the fabric to form a separate layer.

Said layer 109 preferably comprises a fluorinated polymer, for example PTFE, and a treatment elastomer, for example a material similar to the one used for the body compound or fluoroelastomer.

Advantageously one or more copolymers formed from a monomer containing nitrile groups and a diene can be used as elastomers for the fourth treatment.

Advantageously the monomers containing the nitrile groups are in a percentage ranging from 15 to 60% with respect to the total final copolymers.

More advantageously they are between 15 and 25% by weight for cold applications with temperatures down to −40° C., between 33 and 39% by weight for belts with dry applications and between 39 and 51% by weight for applications in oil.

Even more advantageously for applications in oil they are between 49 and 51% by weight, for example 50% by weight, while for dry applications they are between 19 and 23% by weight, for example 21% by weight.

More advantageously the treatment copolymer (s) used are nitrile rubbers and/or fluoroelastomers, even more advantageously they are acrylonitrile butadiene rubbers, known under the acronym NBR. Even more advantageously they are hydrogenated acrylonitrile butadiene rubbers or HNBR or they are also XHNBR, namely carboxylated hydrogenated acrylonitrile butadiene rubbers.

By appropriately choosing the quantities of the materials composing the fourth treatment, a covering layer is formed distinct and separate from the fabric, below also called resistant layer 109. Advantageously the fluorinated polymer is present in the resistant layer 109 in a quantity greater in phr than the sum of the fluorinated elastomer and the second elastomeric material.

The thickness of the resistant layer 109 advantageously ranges from 0.03 mm to 0.3 mm.

The resistant layer 109 can be arranged over the fabric 108 in different ways. Preferably it is arranged by means of a calendering step.

Between the fabric 109 and the resistant layer 108 an adhesive material can be arranged to improve the adhesion of the resistant layer 109 on the fabric 108.

Preferably, to ensure the necessary resistance, the resistant layer 108 has a weight ranging from 200 to 400 g/m².

Preferably also the back 107 of the belt is covered by a covering fabric 110 comprising at least an elastic thread made of elastolefin, even more preferably the fabrics on the work surface 105 and on the back 107 are identical.

Preferably also the covering fabric 110 of the back 107 is treated with different treatments. Treating the back 107 with a treatment similar to the fourth treatment of the fabric 108 covering the work surface 105 described above was found to be particularly advantageous. More advantageously said fourth treatment forms a resistant layer over the fabric. Even more preferably the resistant layer that covers the covering fabric 110 of the back 107 is identical to the one that covers the covering fabric 108 of the teeth.

Preferably both in warp and weft a fabric is used with dtex ranging from 25 to 250 dtex, more preferably from 30 to 110 dtex.

Preferably the weft elongation is greater than 90% % at 100 N and greater than 50% % at 20 N. The sample is raw. It is tested on dynamometer as a sample of a 50 mm wide fabric and the distance between the two dynamometer clamps is 75 mm. It is elongated at a speed of 500 mm/min.

From an examination of the characteristics of the belt produced according to the present invention, the advantages it offers are evident.

Using a transmission belt, both poly-V and toothed, according to the present invention considerable improvements have been obtained and, in particular, it has been possible to overcome the problems described above. In particular, thanks to the use of a fabric 9, 10, 108, 110 as fibrous covering material it is possible to obtain at low cost an elastic fabric that adapts optimally to the profile of the ribs 5 or the teeth 106.

Furthermore, the use of elastolefin avoids the known drawbacks connected with the use of polyurethane as previously described and in particular, the creation of empty spaces that give rise to defects during use of the belt.

The invention claimed is:

1. A power transmission belt comprising a body in a first elastomeric material, a plurality of cords embedded in the body of the belt, a back and a plurality of ribs or teeth, said back or said ribs or teeth are covered with a covering material selected from the group consisting of woven fabric, and knitted fabric, characterized in that said covering material comprises elastolefin fibers, which is a fibrous polymer material made of at least 95% by weight of partially cross-linked macromolecules comprising ethylene and another olefin, wherein the elastolefin fibers are elastic in that when elongated by 50%, the fibers return to an original length.

2. The transmission belt according to claim 1, wherein the elastolefin fibers form at least one elastolefin thread.

3. The transmission belt according to claim 2, characterized in that said covering material is the woven fabric.

4. The transmission belt according to claim 1, characterized in that said belt is a toothed belt.

5. The transmission belt according to claim 3, characterized in that the woven fabric comprises an elastolefin thread and at least one thread with high thermal and mechanical resistance.

6. The transmission belt according to claim 5, characterized in that the at least one high thermal and mechanical resistance thread comprises a polyamide thread.

7. The transmission belt according to claim 6, characterized in that said polyamide is an aromatic polyamide.

8. The transmission belt according to claim 5, characterized in that the woven fabric comprises the elastolefin thread, two threads with high thermal and mechanical resistance, and an elastic thread.

9. The transmission belt according to claim 1, characterized in that said belt is a poly-V belt.

10. The transmission belt according to claim 9, characterized in that said covering material is a knitted fabric.

11. The transmission belt according to claim 10, characterized in that said knitted fabric is a warp knitted structure.

12. The transmission belt according to claim 10, characterized in that said knitted fabric comprises a polyamide thread.

13. The transmission belt according to claim 10, characterized in that said knitted fabric comprises a polyamide thread, and a polyester or cotton thread.

14. The transmission belt according to claim 10, wherein the elastolefin fibers forms an elastolefin thread, and the knitted fabric comprises the elastolefin thread and an elastic thread.

15. A power transmission system of a motor vehicle comprising a belt according to claim 1.

16. The power transmission system of claim 15, wherein the belt is a toothed belt or a poly-V belt.

17. The power transmission system of claim 15, wherein the covering material is the woven fabric, the elastolefin fibers form an elastolefin thread, and the woven fabric includes a polyamide thread and/or an elastic thread.

18. The power transmission system of claim 17, wherein the polyamide thread is an aromatic polyamide thread.

19. The power transmission system of claim 15, wherein the covering material is the knitted fabric, the elastolefin fibers form an elastolefin thread, and the woven fabric includes a polyamide thread and/or an elastic thread.

20. The power transmission system of claim 15, wherein the covering material is the knitted fabric, the elastolefin fibers form an elastolefin thread, and the woven fabric includes a polyamide thread, and a polyester thread or a cotton thread.

21. The transmission belt according to claim 11, characterized in that said warp knitted structure has warp threads that comprise a meta-polyamide thread fiber.

22. The transmission belt according to claim 21, characterized in that said warp knitted structure has weft threads that comprise the elastolefin fibers as an elastolefin thread on which a plurality of poly para-aramid threads is wound, wherein the knitted fabric has a tensile strength, before application of a treatment, in the longitudinal direction of the poly-V belt in a range of 700 to 1300 N/25 mm.

23. The transmission belt according to claim 1, characterized in that said elastolefin fibers comprises a base for an elastic thread configured to allow the woven fabric or the knitted fabric to extend during vulcanization and avoid discontinuities during the vulcanization process.

* * * * *